M. KLAREN.
DOUGH RAISING CABINET.
APPLICATION FILED MAR. 22, 1911.

1,042,235.

Patented Oct. 22, 1912.

Witnesses
H. H. Lybrand
V. B. Hillyard,

Inventor
Mathias Klaren
By Victor J. Evans
Attorney

UNITED STATES PATENT OFFICE.

MATHIAS KLAREN, OF LAWTON, OKLAHOMA.

DOUGH-RAISING CABINET.

1,042,235.   Specification of Letters Patent.   Patented Oct. 22, 1912.

Application filed March 22, 1911. Serial No. 616,132.

*To all whom it may concern:*

Be it known that I, MATHIAS KLAREN, a citizen of the United States, residing at Lawton, in the county of Comanche and State of Oklahoma, have invented new and useful Improvements in Dough-Raising Cabinets, of which the following is a specification.

The primary purpose of the invention is the provision of a cabinet in which dough may be placed for raising during the process of fermentation, the cabinet being provided with a lamp heater whereby any given temperature may be maintained.

The invention provides a construction for equalizing the heat or temperature throughout the interior of the cabinet to insure a uniform fermentation of the dough and also to prevent overheating or burning thereof.

The cabinet may be used advantageously for storage purposes in cold weather to prevent freezing and at other times for storage and as a table.

The invention consists of the novel features, details of construction and combination of parts, which hereinafter will be more particularly set forth, illustrated in the accompanying drawing, and pointed out in the appended claims.

Figure 1:
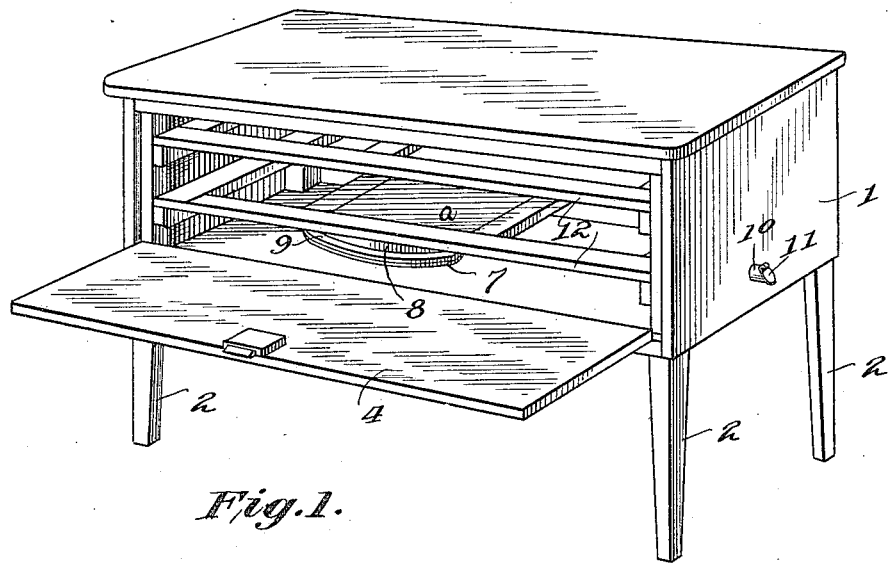
Figure 2:
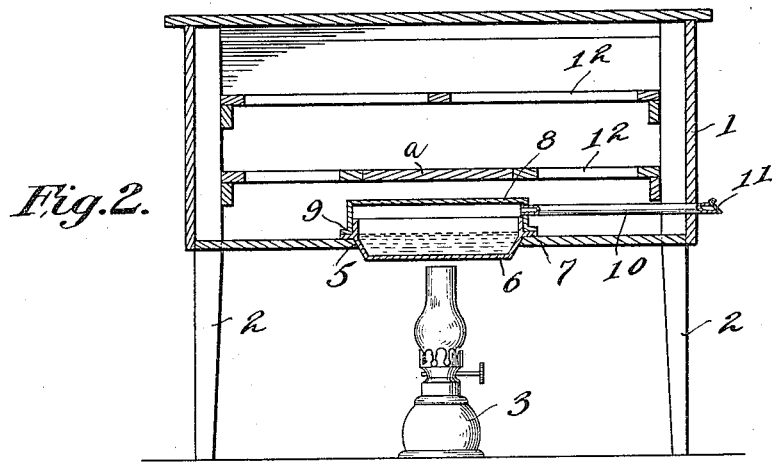

Referring to the drawing, forming a part of the specification, Figure 1 is a perspective view of a cabinet embodying the invention. Fig. 2 is a vertical central longitudinal section thereof.

Corresponding and like parts are referred to in the following description, and indicated in all the views of the drawing, by the same reference characters.

The cabinet is indicated at 1 and consists of a box-like structure mounted upon legs or uprights 2, whereby provision is had for the placing of a heater 3 beneath the same. The cabinet may be of any size or construction and may be of any design. The front of the cabinet is open and adapted to be closed by means of a door 4, which, for convenience, is hinged so as to swing outwardly and downwardly to be out of the way when placing articles in the cabinet or removing the contents therefrom. An opening 5 is formed in the bottom of the cabinet at a central point and receives a shallow pan 6, which has an outer flange 7 to overlap the part of the bottom bordering upon the opening 5 so as to support the pan within the opening. A cover 8 is fitted to the upper portion of the pan 6 and has an outer flange 9 at the lower edge of its rim to overlap and rest upon the flange 7, thereby forming a close joint between the cover and pan. The pan 5 is adapted to contain a quantity of water and the steam resulting is retained by the cover 8 and carried off by means of a pipe 9, jointed thereto and extending horizontally and projecting through an opening in a side of the cabinet and having its outer end inclined and closed by means of a valve 11, which is hinged to the upper portion of the pipe and is held closed by gravity, said valve opening by the pressure of any steam that may collect in the cover 8, thereby relieving the pressure. The heater 3 may be of any design or make but preferably consists of a lamp of ordinary construction.

The interior of the cabinet is provided with a plurality of shelves, which may be of any formation so as to receive and support the utensils or pans containing the dough to be set aside for raising or for receiving other articles to be stored. The lowermost shelf has the part *a* directly above the pan 6 solid so as to act as a baffle or deflector to distribute the heat. The upper shelves are of open work to admit of the warm air circulating freely. The shelves are indicated at 12 and are made removable, being supported upon rests or strips in the well known manner.

The device as a whole while primarily intended for dough raising may be used as a table or safe and in cold weather edibles therein may be prevented from freezing.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A cabinet of the character set forth having an opening in its bottom, a shallow pan adapted to receive a quantity of water placed in said opening and having an outer flange to overlap the part of the bottom bordering upon the opening to make a close joint and to support the pan, a cover fitted to the upper portion of the pan, means for heating the water in the pan, and a pipe connected with the cover and extending through a wall of the cabinet to carry off steam.

2. A cabinet having an opening in its bottom and adapted to receive a heater beneath said opening, a shallow pan adapted to receive a quantity of water supported in the opening and having an outer flange near its upper end, said flange overlapping the part of the bottom bordering upon the opening therein, a cover for closing the upper end of the pan engaging the outer flange thereof, a pipe connected with the cover and extending through a wall of the cabinet and having its outer end inclined, and a cover for closing the outer end of the pipe and hinged to the upper side thereof.

3. A cabinet for the purpose specified mounted upon legs and having an opening in its bottom, a plurality of shelves arranged within the cabinet, the lowermost shelf having its central portion made solid, a shallow pan adapted to receive a quantity of water having an outer flange and supported in the opening in the bottom of the cabinet by said outer flange, a cover for closing the upper end of said pan and having an outer flange at the lower edge of its pendent rim to rest upon the outer flange of the pan, means for heating the water in the pan, a pipe connected to the cover and extending through a side of the cabinet and having its outer end inclined, and a cover hinged to the upper portion of the pipe and closing against the inclined end thereof.

In testimony whereof I affix my signature in presence of two witnesses.

MATHIAS KLAREN.

Witnesses:
  H. C. LLOYD,
  ANNA NOBLE.